(12) United States Patent
Sivakumar et al.

(10) Patent No.: US 12,248,820 B2
(45) Date of Patent: Mar. 11, 2025

(54) ADAPTIVE HYBRID CLOUD RESOURCE MANAGEMENT

(71) Applicant: INTERNATIONAL BUSINESS MACHINES CORPORATION, Armonk, NY (US)

(72) Inventors: Gandhi Sivakumar, Bentleigh (AU); Kushal S. Patel, Pune (IN); Luke Peter Macura, Lucas (AU); Sarvesh S. Patel, Pune (IN)

(73) Assignee: International Business Machines Corporation, Armonk, NY (US)

(*) Notice: Subject to any disclaimer, the term of this patent is extended or adjusted under 35 U.S.C. 154(b) by 752 days.

(21) Appl. No.: 17/513,522

(22) Filed: Oct. 28, 2021

(65) Prior Publication Data

US 2023/0138597 A1    May 4, 2023

(51) Int. Cl.
G06F 9/50 (2006.01)
G06F 9/48 (2006.01)
G06F 12/02 (2006.01)

(52) U.S. Cl.
CPC .......... *G06F 9/5083* (2013.01); *G06F 9/4862* (2013.01); *G06F 12/0238* (2013.01); *G06F 2212/202* (2013.01)

(58) Field of Classification Search
None
See application file for complete search history.

(56) References Cited

U.S. PATENT DOCUMENTS

| | | | |
|---|---|---|---|
| 10,019,181 B2 | 7/2018 | Singh | |
| 10,140,036 B2 | 11/2018 | Kelner | |
| 11,853,785 B1* | 12/2023 | Tsai | G06F 9/45558 |
| 11,941,454 B1* | 3/2024 | Gupta | G06F 9/45533 |
| 2015/0331473 A1 | 11/2015 | Jreji | |
| 2016/0062421 A1 | 3/2016 | Sugawara | |
| 2018/0321864 A1 | 11/2018 | Benisty | |
| 2019/0082010 A1 | 3/2019 | Friedman | |
| 2019/0138209 A1 | 5/2019 | Benisty | |
| 2020/0004445 A1 | 1/2020 | Benisty | |
| 2020/0019433 A1 | 1/2020 | Qiu | |
| 2021/0064430 A1 | 3/2021 | Srivastava | |

(Continued)

FOREIGN PATENT DOCUMENTS

CN    108628775    10/2018
EP    3572948 A1    11/2019

OTHER PUBLICATIONS

PCT International Search Report and WO, Date of Mailing Mar. 7, 2023, International application No. PCT/EP2022/078645, International filing date Oct. 14, 2022, 17 pages.

(Continued)

*Primary Examiner* — Wynuel S Aquino
(74) *Attorney, Agent, or Firm* — Schmeiser, Olsen & Watts, LLP; Edward Wixted

(57) ABSTRACT

A method includes collecting, by one or more processors of a computer system, digestive capabilities for Input Output Queues (IOQs) of infrastructure components in a hybrid cloud infrastructure, and allocating, by the one or more processors of the computer system, nonvolatile memory express (NVMe) storage cloud resources for the hybrid cloud infrastructure based on the collected digestive capabilities for IOQs of the infrastructure components.

21 Claims, 10 Drawing Sheets

(56) References Cited

U.S. PATENT DOCUMENTS

2021/0263677 A1  8/2021 Patel
2022/0179710 A1* 6/2022 Xiang .................. G06F 9/4856

OTHER PUBLICATIONS

Method and Apparatus for Temperature Reduction for NVMe Storage System for Retention of Premium Application Performance, IP.com No. IPCOM000261802D, IP.com Electronic Publication Date: Apr. 5, 2020, 8 pages.
Kim et al., NVMeDirect: A User-space I/O Framework for Application-specific Optimization on NVMe SSDs, Published Date: Jun. 21, 2016, 5 pages.
Mell, Peter et al.; "The NIST Definition of Cloud Computing;" National Institute of Standards and Technology; Special Publication 800-145; Sep. 2011; 7 pages.

* cited by examiner

ADAPTIVE HYBRID CLOUD RESOURCE MANAGEMENT

BACKGROUND

Cloud computing and cloud storage have become the preferred method for delivering information and online functionality. While some cloud services focus on providing consumers with a broad range of services and functionalities, including e-tail shopping, research, social media networking, entertainment consumption and protecting important digital documents, other cloud services focus on small businesses, large enterprises, governments and other institutions. Various cloud services provide cloud storage to consumers at no charge, while others charge some type of subscription-based fee. There are also private clouds that are owned and controlled by an organization, providing a secure network for sharing critical software and data. For example, hospitals can choose to use public archiving services for electronic medical records (EMR) and patient image data (using PACS), or they can create their own cloud archive solution.

The types of storage layers for Infrastructure-as-a-Service (IaaS) include capabilities such as web or virtual machines (VMs), storage for online file sharing, backup or archiving, database, search and development tools. These capabilities enable cloud providers themselves or third parties to create customized solutions by combining the various cloud functionalities or layers with services provided.

SaaS cloud storage solutions include file, document, music, photo and video sharing, backup/restore, DC and DR, along with archiving capabilities. Other cloud storage options include database, big data analytics (including Hadoop and map-reduce based services), cloud drives and other applications exploiting back-end cloud storage. Cloud storage solutions also extend to products and solutions used for deploying public, private and hybrid clouds.

With the enablement of high-speed technologies like NVMe and other high speed interconnect hardware capabilities, the cloud infrastructure has started adopting newer storage terminologies to gain better performance. In cloud storage infrastructure, multiple storage devices are connected to the host applications via means of interconnect protocols. These interconnect protocols offer the end-to-end data transmission capability for block storage over the SAN network of the cloud storage infrastructure layer. Multiple applications may be installed on the same compute instance (for example, an EC2 instance at compute level orchestration that shares hardware resources using standard orchestrated cloud solutions). Alternatively, multiple application running of different compute instances (or VMs/Dockers/container objects) comprising different pricing characteristics and operational requirements are resident on the same physical server. These instances are accessed by the same interconnect fabric with different IOQs (input/output queues) created from the application layer to the actual cloud storage infrastructure.

In case of NVMe over Ethernet like technologies, the IO session can be created directly from application-level entities (e.g. VMs/Dockers/container objects). In such cases, underlying hardware entities can be virtualized and transparently managed to submit the SCSI IO commands. Due to the direct NVMe-over Ethernet session established from application level instances, the underlying hardware has no information about application level processing capabilities. In the technologies like NVMe, the session is created from a VM on which the AI application is running and then the application can directly start creating an IOQ over the pre-created session. While creating an IOQ, the CPU core at both the endpoints needs to be tagged for a certain IOQ. This is primarily due to lockless architecture for parallel IO transmission. When the application IOQ is created at the upper layer of cloud orchestration, the relative CPU core mapping is performed at the storage backend to enable the IOQ CREATE success. Due to the platform transparency in between application level processing entity and the storage cloud infrastructure, the resource provisioning system and the cloud orchestration has no role in IOQ creation process. Due to the this, the underlying processing capabilities are unknown while creating application IOQs over NVMe-over ethernet (NVMe-oE) sessions.

When any new IOQ request comes to the NVMe Target subsystem, it allocates a CPU core based on its own logic which is no relation to host or application-level processing capabilities. This creates lag in the processing capability of the target. This further creates misbalance between the IOQs, and performance balancing is lost at the backend subsystem. Additionally, there is no way by which the upper layer processing capability (e.g. EC2 instance's core allocation), available memory and other information like BareMetal infrastructure information can be considered while making the core mapping by an administrator. Further, as the processing capabilities can be dynamically changed at a cloud processing layer which are not propagated to the storage infrastructure layer, a performance penalty is created even when more compute resources are mapped to the instance which costs more. This creates overall imbalance in the system even when an AI application is paying more for faster data processing. These problems become more important when the system must undergo frequent migrations between the physical resources in the system, and the performance is inconsistent as the IOQs are not managed based on digestive capabilities of the AI applications.

SUMMARY

According to one embodiment, a method includes collecting, by one or more processors of a computer system, digestive capabilities for Input Output Queues (IOQs) of infrastructure components in a hybrid cloud infrastructure, and allocating, by the one or more processors of the computer system, nonvolatile memory express (NVMe) storage cloud resources for the hybrid cloud infrastructure based on the collected digestive capabilities for IOQs of the infrastructure components. Advantages of the above-described method include consistent application performance, which can be gained with better resource allocation at both the cloud initiator (host, instance and/or virtual machine), and target subsystem. Further, the methodology avoids packet drops at various networking entities and saving a cloud's backbone network from congestion.

Additionally or alternatively, the method includes collecting, by the one or more processors of the computer system, infrastructure and IOQ capacity information of a computing instance in the hybrid cloud infrastructure, and adding, by the one or more processors of the computer system, the infrastructure and IOQ capacity information from the computing instance to a model space, the model space configured to provide computational insights as to the digestive capabilities of the computing instance based on the collected information. Advantages of collecting and adding this infrastructure information to a model space is allowing insights and machine learning related to IOQ capacity of a system to take place.

Additionally or alternatively, the method includes collecting, by the one or more processors of the computer system, infrastructure and IOQ capacity information of a target subsystem in the hybrid cloud infrastructure, adding, by the one or more processors of the computer system, the infrastructure and IOQ capacity information of the target subsystem to the model space, the model space configured to provide computational insights as to the digestive capabilities of the target subsystem based on the collected information, and determining, by the one or more processors of the computer system, end-to-end digestive capability for IOQs in the hybrid cloud infrastructure from the collected infrastructure and IOQ capacity information of the computing instance and the target subsystem. By determining the end-to-end digestive capability for IOQs in a hybrid cloud infrastructure, the present invention may thus be configured to maintain quality of service across multi-tenant environments, whereby other IOQs from other tenants can be allocated to a better resource so that they are not consumed unnecessarily. Advantages of collecting and adding this infrastructure information to a model space is allowing insights and machine learning related to IOQ capacity of a system to take place.

Additionally or alternatively, the method includes collecting, by the one or more processors of the computer system, IOQ information, workload and queue-to-core mapping on the target subsystem, determining, by the one or more processors of the computer system, a collective resource weightage for the target subsystem from the collected IOQ information, workload and queue-to-core mapping on the target subsystem, and performing, by the one or more processors of the computer system, a capability match and identifying the queue-to-core mapping of the computing instance based on the collecting and determining. Advantages of collecting and adding this information and performing a capability match allows better resource allocation at both the cloud initiator (host, instance and/or virtual machine), and target subsystem.

Additionally or alternatively, the method includes collecting, by the one or more processors of the computer system, digestive capabilities for IOQs of applications running in the computing instance in the hybrid cloud infrastructure, and tuning, by the one or more processors of the computer system, application level IOQs of the computing instance in the hybrid cloud infrastructure using the end-to-end digestive capability for IOQs in the hybrid cloud infrastructure and the collected digestive capabilities for IOQs of applications running in the computing instance in the hybrid cloud infrastructure. Advantages of the above-described method include the ability to further consider the digestive capability of the application layer at the host, instance and/or virtual machine to avoid retransmission and packet drops as a result of application layer constraints.

Additionally or alternatively, the method includes throttling, by the one or more processors of the computer system, IOQ values of a computing instance in the hybrid cloud infrastructure during the tuning for core-to-queue mapping based on endpoint resources of the target subsystem and the computing instance. Advantages of throttling include the ability to prevent packet loss that would otherwise occur.

Additionally or alternatively, the method includes migrating, by the one or more processors of the computer system, the computing instance to from the hybrid cloud infrastructure to a second hybrid cloud infrastructure, performing, by the one or more processors of the computer system, a calculation of the end-to-end digestive capability for IOQs in the second hybrid cloud infrastructure, and determining, by the one or more processors of the computer system, that the end-to-end digestive capability for IOQs of the hybrid cloud infrastructure are different than the end-to-end digestive capability for IOQs of the second hybrid cloud infrastructure prior to the informing. By determining the end-to-end digestive capability for IOQs in a hybrid cloud infrastructure, the present invention may thus advantageously be configured to maintain quality of service across multi-tenant environments, whereby other IOQs from other tenants can be allocated to a better resource so that they are not consumed unnecessarily.

Additionally or alternatively, the accounting includes informing, by the one or more processors of the computer system, an Admin Queue to disconnect the IOQ and reconnect the IOQ with the calculated end-to-end digestive capability accounted for. Advantages of this method include the ability to improve efficiency of a cloud backbone, as effective transmission is scheduled because of core-to-queue alignment provided.

According to another embodiment, a computer system includes one or more processors, one or more memory devices coupled to the one or more processors, and one or more computer readable storage devices coupled to the one or more processors. The one or more storage devices contain program code executable by the one or more processors via the one or more memory devices to implement a method for adaptive hybrid cloud resource management. The method includes collecting, by the one or more processors of the computer system, digestive capabilities for Input Output Queues (IOQs) of infrastructure components in a hybrid cloud infrastructure; and allocating, by the one or more processors of the computer system, nonvolatile memory express (NVMe) storage cloud resources for the hybrid cloud infrastructure based on the collected digestive capabilities for IOQs of the infrastructure components. Advantages of the above-described method include consistent application performance, which can be gained with better resource allocation at both the cloud initiator (host, instance and/or virtual machine), and target subsystem. Further, the methodology avoids packet drops at various networking entities and saving a cloud's backbone network from congestion.

Additionally or alternatively, the method includes collecting, by the one or more processors of the computer system, infrastructure and IOQ capacity information of a computing instance in the hybrid cloud infrastructure, and adding, by the one or more processors of the computer system, the infrastructure and IOQ capacity information from the computing instance to a model space, the model space configured to provide computational insights as to the digestive capabilities of the computing instance based on the collected information. Advantages of collecting and adding this infrastructure information to a model space is allowing insights and machine learning related to IOQ capacity of a system to take place.

Additionally or alternatively, the method includes collecting, by the one or more processors of the computer system, infrastructure and IOQ capacity information of a target subsystem in the hybrid cloud infrastructure, adding, by the one or more processors of the computer system, the infrastructure and IOQ capacity information of the target subsystem to the model space, the model space configured to provide computational insights as to the digestive capabilities of the target subsystem based on the collected information, and determining, by the one or more processors of the computer system, end-to-end digestive capability for IOQs in the hybrid cloud infrastructure from the collected infrastructure and IOQ capacity information of the computing instance and the target subsystem. Advantages of collecting and adding this infrastructure information to a model space is allowing insights and machine learning related to IOQ capacity of a system to take place.

Additionally or alternatively, the method includes collecting, by the one or more processors of the computer system, IOQ information, workload and queue-to-core mapping on the target subsystem, determining, by the one or more processors of the computer system, a collective resource weightage for the target subsystem, performing, by the one or more processors of the computer system, a capability match and identifying the queue-to-core mapping of the computing instance based on the collecting and determining. Advantages of collecting and adding this information and performing a capability match allows better resource allocation at both the cloud initiator (host, instance and/or virtual machine), and target subsystem.

Additionally or alternatively, the method includes collecting, by the one or more processors of the computer system, digestive capabilities for IOQs of applications running in the computing instance in the hybrid cloud infrastructure, and tuning, by the one or more processors of the computer system, application level IOQs of the computing instance in the hybrid cloud infrastructure using the end-to-end digestive capability for IOQs in the hybrid cloud infrastructure and the collected digestive capabilities for IOQs of applications running in the computing instance in the hybrid cloud infrastructure. Advantages of the above-described method include the ability to further consider the digestive capability of the application layer at the host, instance and/or virtual machine to avoid retransmission and packet drops as a result of application layer constraints.

Additionally or alternatively, the method includes migrating, by the one or more processors of the computer system, the computing instance to from the hybrid cloud infrastructure to a second hybrid cloud infrastructure, performing, by the one or more processors of the computer system, a calculation of the end-to-end digestive capability for IOQs in the second hybrid cloud infrastructure, and determining, by the one or more processors of the computer system, that the end-to-end digestive capability for IOQs of the hybrid cloud infrastructure are different than the end-to-end digestive capability for IOQs of the second hybrid cloud infrastructure prior to the informing. By determining the end-to-end digestive capability for IOQs in a hybrid cloud infrastructure, the present invention may thus advantageously be configured to maintain quality of service across multi-tenant environments, whereby other IOQs from other tenants can be allocated to a better resource so that they are not consumed unnecessarily.

According to another embodiment, a computer program product for adaptive hybrid cloud resource management includes one or more computer readable storage media having computer readable program code collectively stored on the one or more computer readable storage media, the computer readable program code being executed by one or more processors of a computer system to cause the computer system to perform a method. The method includes collecting, by the one or more processors of the computer system, digestive capabilities for Input Output Queues (IOQs) of infrastructure components in a hybrid cloud infrastructure, and allocating, by the one or more processors of the computer system, nonvolatile memory express (NVMe) storage cloud resources for the hybrid cloud infrastructure based on the collected digestive capabilities for IOQs of the infrastructure components. Advantages of the above-described method include consistent application performance, which can be gained with better resource allocation at both the cloud initiator (host, instance and/or virtual machine), and target subsystem. Further, the methodology avoids packet drops at various networking entities and saving a cloud's backbone network from congestion.

Additionally or alternatively, the method includes collecting, by the one or more processors of the computer system, infrastructure and IOQ capacity information of a computing instance in the hybrid cloud infrastructure, and adding, by the one or more processors of the computer system, the infrastructure and IOQ capacity information from the computing instance to a model space, the model space configured to provide computational insights as to the digestive capabilities of the computing instance based on the collected information. Advantages of collecting and adding this infrastructure information to a model space is allowing insights and machine learning related to IOQ capacity of a system to take place.

Additionally or alternatively, the method further includes: collecting, by the one or more processors of the computer system, infrastructure and IOQ capacity information of a target subsystem in the hybrid cloud infrastructure, adding, by the one or more processors of the computer system, the infrastructure and IOQ capacity information of the target subsystem to the model space, the model space configured to provide computational insights as to the digestive capabilities of the target subsystem based on the collected information, and determining, by the one or more processors of the computer system, end-to-end digestive capability for IOQs in the hybrid cloud infrastructure from the collected infrastructure and IOQ capacity information of the computing instance and the target subsystem. By determining the end-to-end digestive capability for IOQs in a hybrid cloud infrastructure, the present invention may thus be configured to maintain quality of service across multi-tenant environments, whereby other IOQs from other tenants can be allocated to a better resource so that they are not consumed unnecessarily.

Additionally or alternatively, the method includes collecting, by the one or more processors of the computer system, IOQ information, workload and queue-to-core mapping on the target subsystem, determining, by the one or more processors of the computer system, a collective resource weightage for the target subsystem; and performing, by the one or more processors of the computer system, a capability match and identifying the queue-to-core mapping of the computing instance based on the collecting and determining. Advantages of collecting and adding this information and performing a capability match allows better resource allocation at both the cloud initiator (host, instance and/or virtual machine), and target subsystem.

Additionally or alternatively, the method includes collecting, by the one or more processors of the computer system, digestive capabilities for IOQs of applications running in the computing instance in the hybrid cloud infrastructure, and tuning, by the one or more processors of the computer system, application level IOQs of the computing instance in the hybrid cloud infrastructure using the end-to-end digestive capability for IOQs in the hybrid cloud infrastructure and the collected digestive capabilities for IOQs of applications running in the computing instance in the hybrid cloud infrastructure. Advantages of the above-described method include the ability to further consider the digestive capability of the application layer at the host, instance and/or virtual machine to avoid retransmission and packet drops as a result of application layer constraints.

Additionally or alternatively, the method further includes migrating, by the one or more processors of the computer system, the computing instance to from the hybrid cloud infrastructure to a second hybrid cloud infrastructure, performing, by the one or more processors of the computer system, a calculation of the end-to-end digestive capability for IOQs in the second hybrid cloud infrastructure, and determining, by the one or more processors of the computer system, that the end-to-end digestive capability for IOQs of the hybrid cloud infrastructure are different than the end-to-end digestive capability for IOQs of the second hybrid cloud infrastructure prior to the informing. By determining the end-to-end digestive capability for IOQs in a hybrid cloud infrastructure, the present invention may thus advantageously be configured to maintain quality of service across multi-tenant environments, whereby other IOQs from other tenants can be allocated to a better resource so that they are not consumed unnecessarily.

According to another embodiment, a method includes collecting, by one or more processors of a computer system, digestive capabilities for IOQs of applications running in a computing instance of a hybrid cloud infrastructure, and tuning, by the one or more processors of the computer system, application level IOQs of the computing instance in the hybrid cloud infrastructure using the collected digestive capabilities for IOQs of applications running in the computing instance of the hybrid cloud infrastructure. Advantages of the above-described method include the ability to further consider the digestive capability of the application layer at the host, instance and/or virtual machine to avoid retransmission and packet drops as a result of application layer constraints.

Additionally or alternatively, the method includes determining, by the one or more processors of the computer system, end-to-end digestive capability for IOQs in the hybrid cloud infrastructure that includes the digestive capabilities for IOQs of applications as well as the digestive capability for IOQs in a target subsystem and the computer instance. By determining the end-to-end digestive capability for IOQs in a hybrid cloud infrastructure, the present invention may thus be configured to maintain quality of service across multi-tenant environments, whereby other IOQs from other tenants can be allocated to a better resource so that they are not consumed unnecessarily. Advantages of collecting and adding this infrastructure information to a model space is allowing insights and machine learning related to IOQ capacity of a system to take place.

According to another embodiment, a method includes migrating, by one or more processors of a computer system, a computing instance from a first hybrid cloud infrastructure to a second hybrid cloud infrastructure, performing, by the one or more processors of the computer system, a calculation of the end-to-end digestive capability for IOQs in the second hybrid cloud infrastructure, and accounting for, by the one or more processors of the computer system, the calculation by initiating an IOQ that accounts for the calculated end-to-end digestive capability. By determining the end-to-end digestive capability for IOQs in a hybrid cloud infrastructure, the present invention may thus advantageously be configured to maintain quality of service across multi-tenant environments, whereby other IOQs from other tenants can be allocated to a better resource so that they are not consumed unnecessarily.

Additionally or alternatively, the method further includes performing, by the one or more processors of the computer system, a calculation of the end-to-end digestive capability for IOQs in the first hybrid cloud infrastructure, and determining, by the one or more processors of the computer system, that the end-to-end digestive capability for IOQs of the first hybrid cloud infrastructure are different than the end-to-end digestive capability for IOQs of the second hybrid cloud infrastructure prior to the informing. Thus, the present invention advantageously accounts for both IOQ digestive capability when both backups and/or migrations of a cloud instance occur.

Additionally or alternatively, the accounting for further includes informing, by the one or more processors of the computer system, an Admin Queue to disconnect the IOQ and reconnect the IOQ with the calculated end-to-end digestive capability accounted for. Advantages of this method include the ability to improve efficiency of a cloud backbone, as effective transmission is scheduled because of core-to-queue alignment provided.

DETAILED DESCRIPTION

Figure 1:
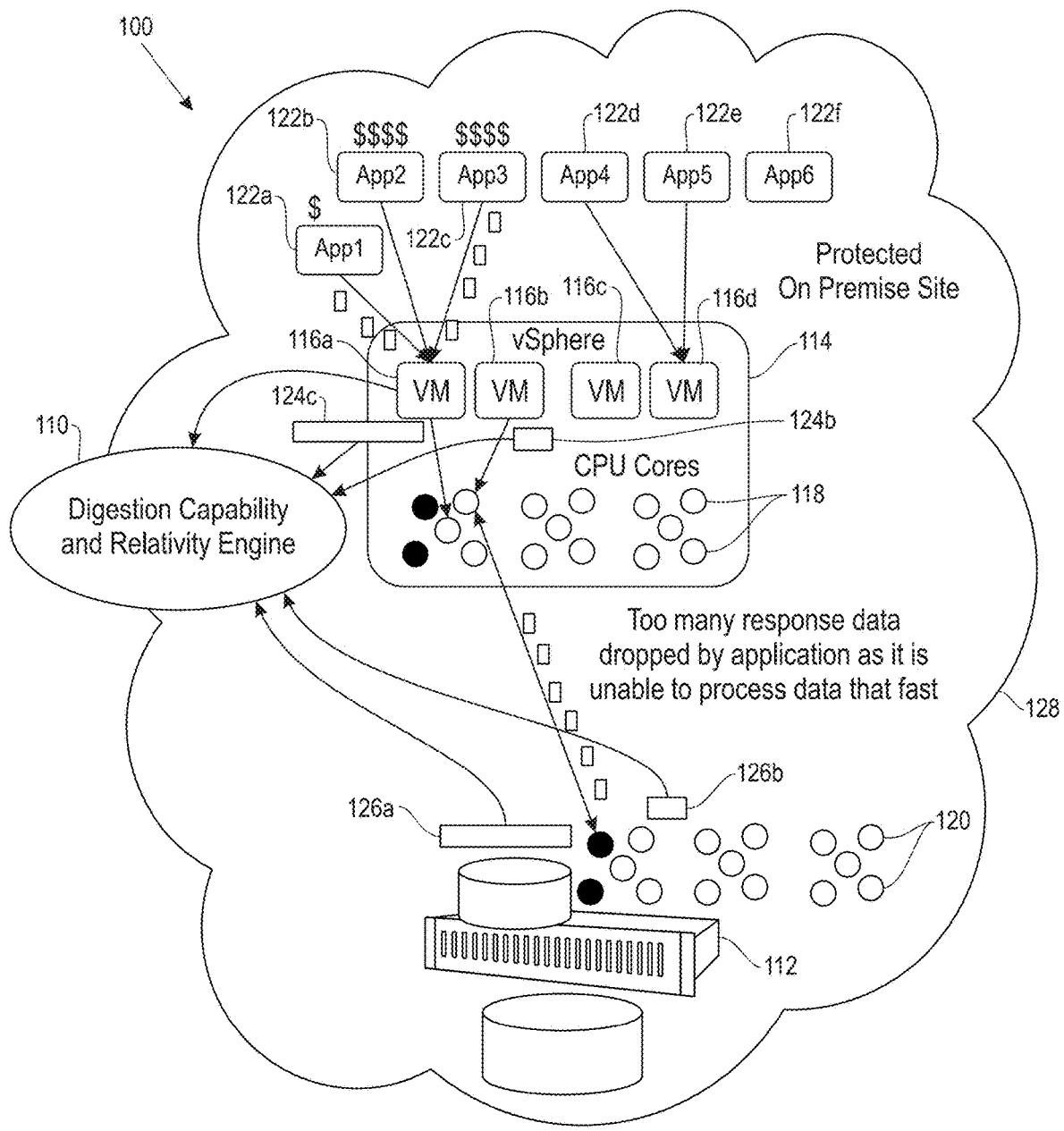
FIG. 1 depicts a schematic of a system for adaptive hybrid cloud resource management, in accordance with embodiments of the present invention.

The present invention provides a method, system and apparatus that works with computing instances in a hybrid cloud infrastructure (e.g. virtual machines) and the application level NVMe-oE based IOQ management system in order to provide the way by which effective IOQ binding is performed at a target subsystem. The core idea provides a method, system and apparatus that works at the hybrid cloud initiator system (i.e. a computing instance in the application layer of a cloud infrastructure) and offers application level IOQ management that can be tuned using the digestive capability of the infrastructure of the system. It is common that the target subsystem has high processing capability in order to serve more hosts, instance and/or virtual machines at the same time. Hybrid cloud systems deploy many hosts, instances and/or virtual machines in multi-tenant environments, each sharing capacity. In such cases, the present invention deploys algorithms in a digestion capability and relativity engine collects information from various data collection platforms within a cloud service provider, and gathers the data to understand the digestion capability of a host, instance, and/or virtual machine. Information such as computing speed, processing speed allocation to the host, instance and/or virtual machine in the cloud orchestration may be collected in this manner. Along with this information, other supporting information such as IO workload from the host or instance and other computational insights may be identified ad added into a model of the digestion capability and relativity engine.

Thus, the present invention provides the digestive capability of a host, instance and/or virtual machine. The digestion capability and relativity engine uses cloud service provider APIs to get infrastructure related information such as CPU cores, and clock speed of cores from the host, instance and/or virtual machine in the cloud orchestration. Additionally, memory and cache sizes may be collected by the digestion capability and relativity engine, which may include application structure located within the host, instance and/or virtual machine in the cloud orchestration. Once the data is collected, the digestion capability and relativity engine may be configured to gather CPU core and IOQ information from the target subsystem. This information can be used to determine end-to-end digestive capability of the IOQ connection. When there are many IOQs created, for example, from a BareMetal initiator, then the capacity of the IOQ digestion for a next IOQ for a host, instance and/or virtual machine may be lower. Similarly, the digestion capability and relativity engine may be configured to gather the IOQ information, workload, and queue-to-core map of the target subsystem, and further gathers the collective weightage for the target subsystem. Based on the combination of endpoints, a capability match may be performed by the digestion capability and relativity engine and accordingly the queue-to-core mapping is identified at the host, instance and/or virtual machine in the cloud orchestration.

Additionally, the digestive capability of applications running in a host, instance or virtual machine in the cloud orchestration using an IOQ connection may be identified by the digestion capability and relativity engine. This identification may include determining min and max data digestion capability of these applications. For example, if application A can handle 2 GB per second incoming IO flow and all further packets are dropped (because the application cannot handle it), it is possible to tag the IOQ to a faster core which will only create packet loss over the cloud's internal network and add inefficiencies in the processing due to the lack of application capability. Data attributes on an initiator (i.e. at the host, instance and/or virtual machine) CPU core, IOQ assignment, and workload on the CPU cores and port attributes may be mapped by the digestion capability and relativity engine. Once this mapping is performed, optimal selections may be made by the digestion capability and relativity engine based on the nature of the connection. The application level capabilities may thus be accounted for so that the digestion capability and relativity engine may be configured to prevent this unwanted scenario by throttling the IO if necessary, based on the application limitations. Throttling values may be imposed on top of the derived insights from the initiator (i.e. at the host, instance and/or virtual machine) or target subsystem, which includes instance based characterizations and then throttling values are selected for core-to-queue mapping.

When the application is migrated to another infrastructure as part of cloud's as part of a migration process for a host, instance, and/or virtual machine, then the information about current characteristics gathered by the digestion capability and relativity engine may be recalculated in order to get the latest capabilities after the migration. In the event that a difference is found between earlier and new capabilities, an Admin Queue may be informed by the digestion capability and relativity engine to disconnect the IOQ and reconnect with new information so that the effective network channel can be made to the target subsystem after the migration. This may invoke the Admin Queue to reconnect the defined IOQ to gain the optimization provided by the digestion capability and relativity engine.

Advantages of the present invention provided by the digestion capability and relativity engine described herein include consistent application performance, which can be gained with better resource allocation at both the cloud initiator (host, instance and/or virtual machine), and target subsystem. Further, the digestion capability and relativity engine may provide advantages over previous systems by avoiding packet drops at various networking entities and saving a cloud's backbone network from congestion. The digestion capability and relativity engine further considers the digestive capability of the application layer at the host, instance and/or virtual machine to avoid retransmission and packet drops as a result of application layer constraints. The digestion capability and relativity engine may be thus configured to improve efficiency of a cloud backbone, as effective transmission is scheduled because of core-to-queue alignment provided. The present invention may be configured to maintain quality of service across multi-tenant environments, whereby other IOQs from other tenants can be allocated to a better resource so that they are not consumed unnecessarily. The digestion capability and relativity engine described herein further does not require extraordinary hardware or software and can be implemented to provide real time solutions for NVMe based storage systems.

FIG. 1 depicts a schematic of a system 100 for adaptive hybrid cloud resource management, in accordance with embodiments of the present invention. The system 100 includes a digestive capability and relativity engine 110, a target subsystem 112, and a cloud instance 114 that includes a plurality of virtual machines 116a, 116b, 116c, 116d. The cloud instance 114 may comprise a plurality of CPU cores 118 running on one or more physical servers. The virtual machines 116a, 116b, 116c, 116d may be running a plurality of applications 122a, 122b, 122c, 122d, 122e, 122f from the cloud instance 114 for a customer. The target subsystem 112 may be any storage server or subsystem that includes a plurality of CPU cores 120. The target subsystem 112 includes buffers 126a, 126b, while the cloud instance 114 includes buffers 124a, 124b.

As shown in FIG. 1, the components of the cloud instance may include the target subsystem 114 server which may have high processing capability and more resources like processors, cores, IOQ connection ability and transmission buffer per IOQ. The target subsystem 112 may have an infrastructure with more initiators and cloud instances associated with the target subsystem 112 (not shown) which include additional applications running on those additional cloud instances. FIG. 1 shows only a single exemplary cloud instance, but it should be understood that the target subsystem 112 may be providing storage capacity for any number of cloud instances, running any number of virtual machines (or the like) for any number of clients. In contrast to the target subsystem 112, the cloud instance 114 may include low dedicated buffer allocation, lower CPU resources, and a diversified CPU operating between the various different applications (e.g. 122a, 122b, 122c) on a single instance.

The digestion capability and relativity engine 110 may initiate data collection services for the cloud instance, and/or any number of additional different cloud instances for different clients running in the hybrid cloud infrastructure 100 (not shown). This process may include a set of API functions which may be configured to connect to the cloud instance, and/or more specifically a customer support plan or CSP of the cloud instance. Authentication with the CSP may be performed before gathering data. Once authenticated, the information about overall digestion capability may be requested by the digestion capability and relativity engine 110 and collected from the cloud instance 114.

Upon reception of the request for information from the digestion capability and relativity engine 110, the cloud instance, or SP resident service thereof, may be configured to collect the type of information requested and locates runtime metadata. The information about the cloud instance or virtual machine PIDs (process identifiers) computing speed, processing speed allocation in the cloud orchestration are enquired by the digestion capability and relativity engine 110 and shared over API functions. Additional information about IO workload in the cloud instance and other computational insights may provided to the digestion capability and relativity engine 110. The digestion capability and relativity engine 110 may thus gather this information and add it to a model builder engine (i.e. a modeling and insights module, described below). The model of the digestion capability and relativity engine 110 may provide insights into the digestive capability for IOQs for the cloud instance 114 and/or the virtual machines 116a, 116b, 116c, 116d and/or the CPU cores 118 thereof. Clock speed of the CPU cores 118 and the type of CPU cores 118 may further be included in the information gathered by the digestion capability and relativity engine 110. Memory buffers 124a, 124b and cache sizes are collected from the digestion capability and relativity engine 110 as well.

Once the above information is gathered, the digestion capability and relativity engine 110 may be configured to then gather information from the target subsystem 112. For example, this may include information related tot the CPU cores 120 and the IOQ information from the target system 112 including information related to the memory buffers 126a, 126b. The mapping of the target system 112 in this manner is provided to the digestion capability and relativity engine 110 and used to determine end-to-end digestive capability of the IOQ connection in totality between the target subsystem 112 and the cloud instance 114. Based on the combination of endpoints the capability match is performed by the model of the digestion capability and relativity engine 110 and accordingly the Queue to core mapping is identified at the cloud instance 114.

Figure 2:
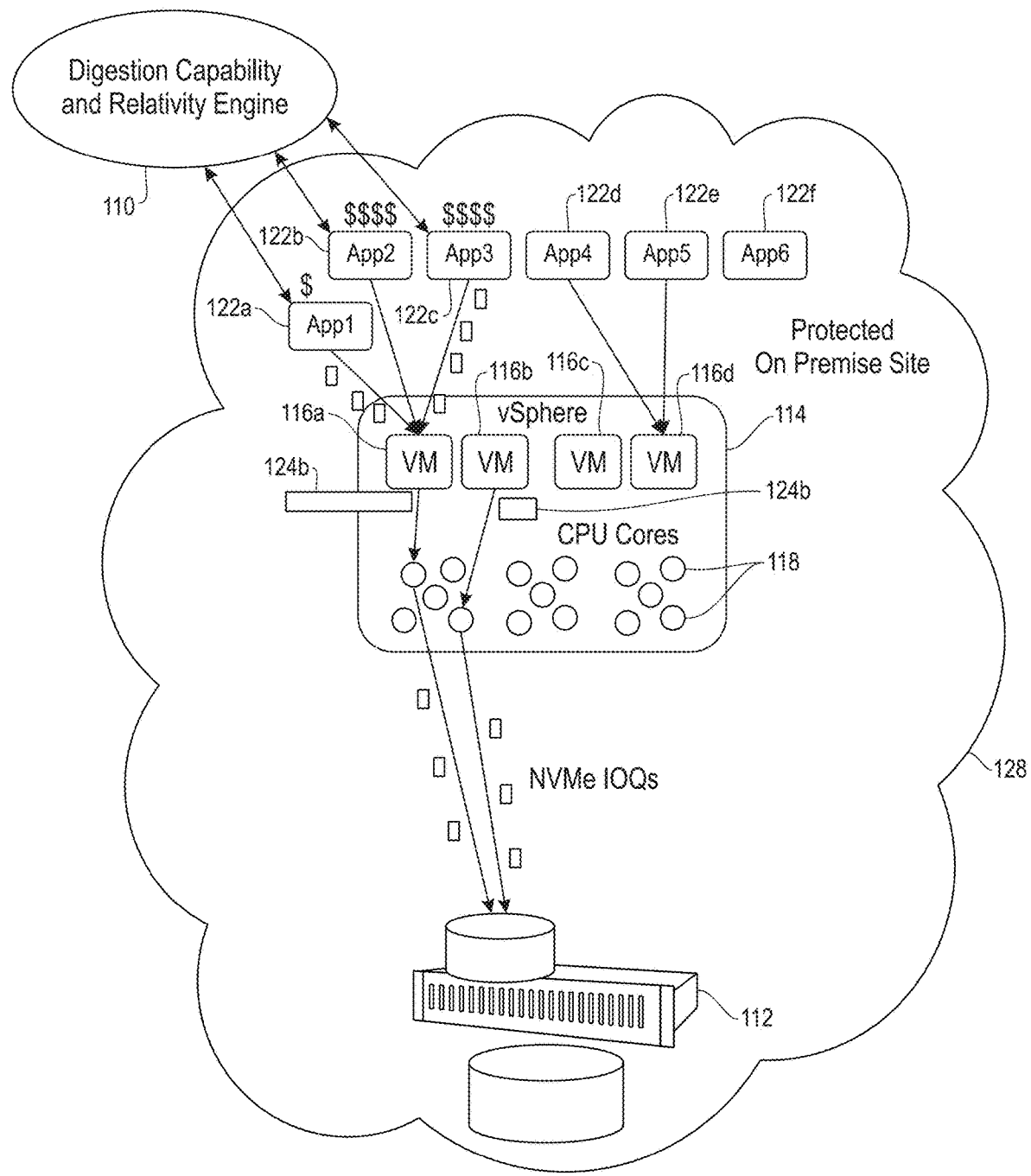
FIG. 2 depicts a schematic of the system for adaptive hybrid cloud resource management of FIG. 1, configured to determine application level digestion capabilities, in accordance with embodiments of the present invention.

FIG. 2 depicts a schematic of the system 100 for adaptive hybrid cloud resource management of FIG. 1, configured to determine application-level digestion capabilities, in accordance with embodiments of the present invention. The system 100 includes the same elements as that shown in FIG. 1. However, the digestion capability and relativity engine 110 is shown further connected to various applications 122a, 122b, 122c operating in the cloud instance 114. This displays that the digestion capability and relativity engine 110 may be connected to any number of applications running on one or more cloud instances in a hybrid cloud infrastructure. The digestion capability and relativity engine 110 may collect information related to the IOQ connections in the applications and may analyze this information in the modeling as well. For example, any naïve classifier may be used to determine min and max data digestion capability associated with the applications. For example, if the application 122a can handle 2 GB per second incoming IO flow and all further packets are dropped (because the application cannot handle more), the present invention might otherwise tag the IOQ to a faster core at the initiator and target, thereby overloading the application even further. The digestion capability and relativity engine 110 may account for and avoid this situation by taking into account application level IOQ flow capacity as well. In this situation, throttling values may be imposed on top of the insights determined by the digestion capability and relativity engine 110 based on the infrastructure of the target subsystem 112 and the cloud instance 114, whereby the throttling accounts additionally for application level information, rather than only infrastructure information.

Figure 3:
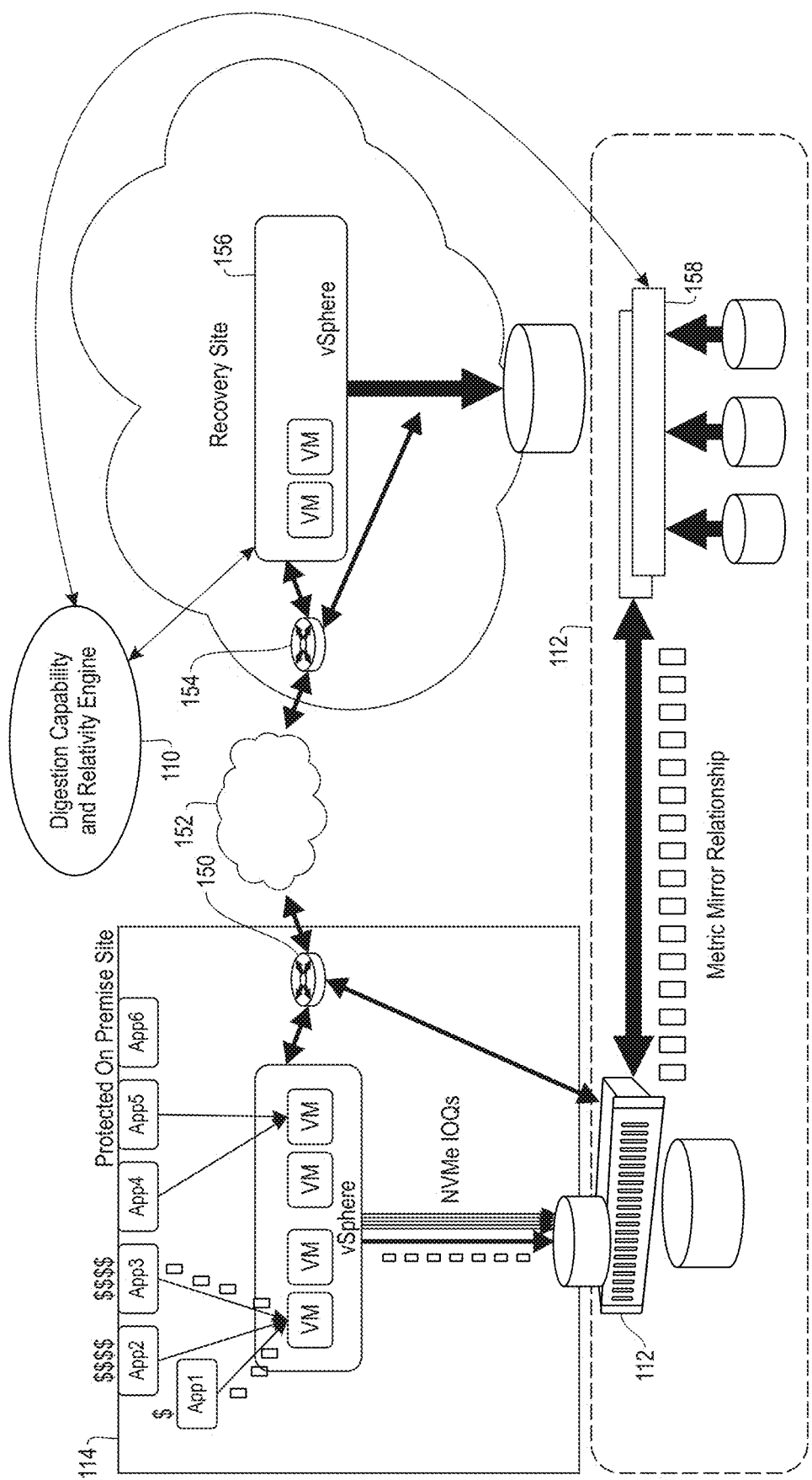
FIG. 3 depicts a schematic of the system for adaptive hybrid cloud resource management of FIG. 1 during a migration to another cloud infrastructure, in accordance with embodiments of the present invention.

FIG. 3 depicts a schematic of the system 100 for adaptive hybrid cloud resource management of FIG. 1 during a migration to second cloud infrastructure 160, in accordance with embodiments of the present invention. The migration shows a migration routing operating system 150 connected to a public network 152. The second cloud infrastructure 160 includes a virtual router appliance 154 connected to a second cloud instance 156. The target subsystem 112 is shown connected to a Bare Metal server 158.

When movement or migration is detected by the digestion capability and relativity engine 110, the digestion capability and relativity engine 110 may initiate a process whereby collection of new backbone characteristics from the second cloud infrastructure 160, including one or both of the second cloud instance 156 and the Bare Metal server 158. The collection of information may be consistent with the process described hereinabove with respect to FIGS. 1 and 2. Digestive capability for IOQs may be recalculated for the second cloud infrastructure 160. This digestive capability may be compared to the calculations made with respect to the original system from FIGS. 1 and 2. In the case a difference is detected between earlier and new capabilities, the Admin Queue of the Bare Metal server 158 may be engaged to disconnect the IOQ and reconnect accounting for the new capability. Suitable cores of the Bare Metal server 158 may be reassigned based on the new migration data.

Figure 4:
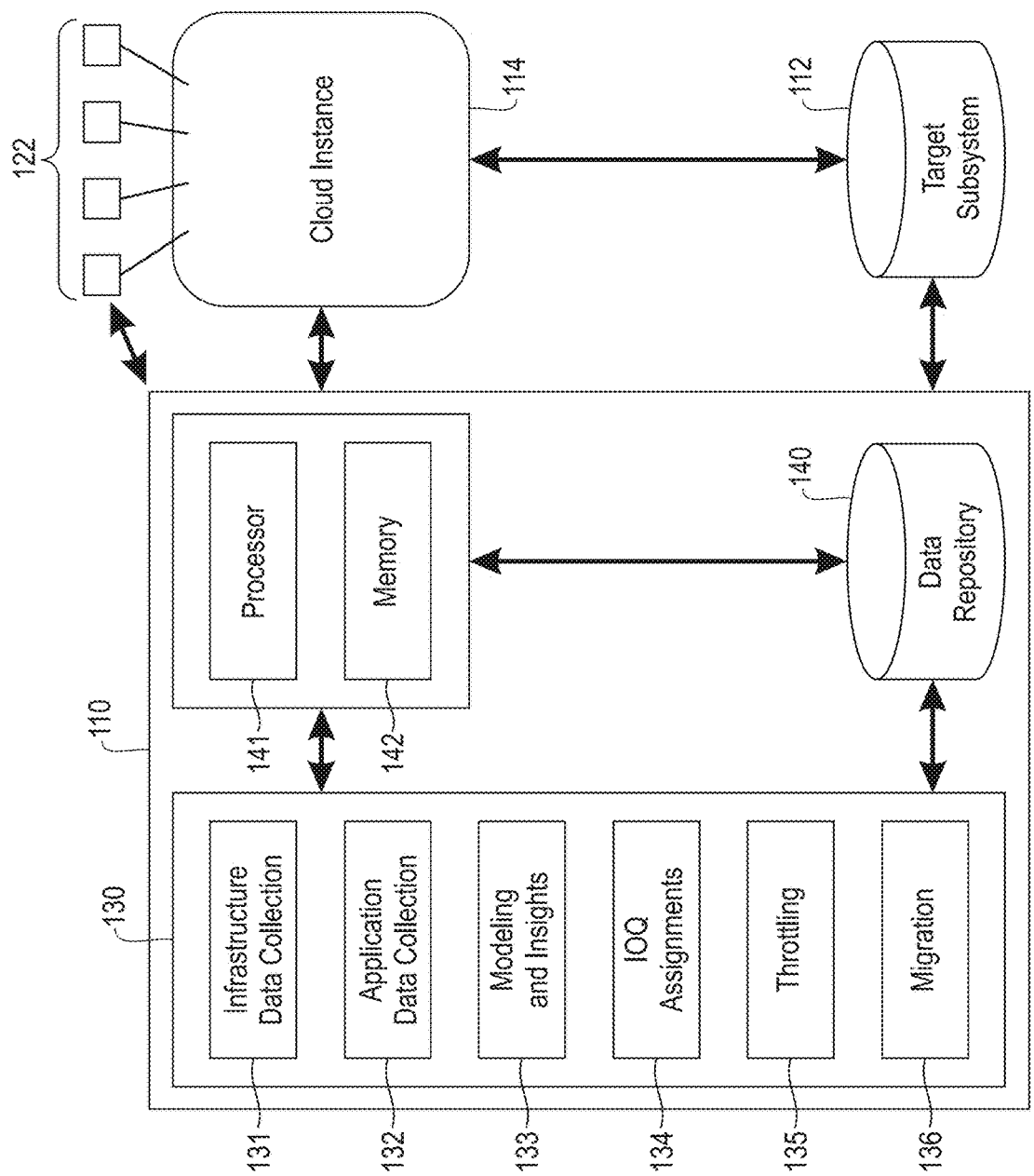
FIG. 4 depicts a block diagram of a module structure of a digestion capability and relativity engine, in accordance with embodiments of the present invention.

FIG. 4 depicts a block diagram of a module structure 130 of the digestion capability and relativity engine 110 of FIGS. 1-3, in accordance with embodiments of the present invention. The module structure 130 includes an infrastructure data collection module 131, an application data collection module 132, a modeling and insights module 133, and a IOQ assignment module 134, a throttling module 135, and a migration module 136. A "module" may refer to a hardware-based module, software based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the digestion capability and relativity engine 120. A module (whether hardware, software, or a combination thereof) may be designed to implement or execute one or more particular functions or routines. The modules may each be separate components of digestion capability and relativity engine 110. In other embodiments, more than one module may be a single combined computer program, or hardware module.

Embodiments of the infrastructure data collection module 131 may include one or more components of hardware and/or software program code for obtaining, retrieving, collecting, or otherwise receiving infrastructure data from the cloud instances 114, 156, and the target subsystems 112, 158, as described hereinabove.

Referring still to FIG. 4, embodiments of the digestion capability and relativity engine 110 may further include the application data collection module 132. Embodiments of the application data collection module 132 may include one or more components of hardware and/or software program code for obtaining, retrieving, collecting, or otherwise digestive capabilities for IOQs of the applications 122 running in the cloud instances 114, 156, as described hereinabove.

Embodiments of the modeling and insights module 133 may include one or more components of hardware and/or software program code for providing modeling and insight into the digestive capabilities for IOQs of the infrastructure and/or applications in the hybrid cloud system. The modeling and insights module 133 may perform calculations in order to optimize the IOQs for the hybrid cloud infrastructure, in the manner described above. Thus, the modeling and insights module 133 may be programmed with algorithms to determine when the IOQs for a system are not optimized, and when CPU cores for a system can be reassigned, for example. The modeling and insights module 133 may be deploy a cognitive neural network, machine learning, or the like for additionally learning from the IOQ information that it collects. The modeling and insights module 133 may deploy mathematical models such as naïve classifiers to maximize, minimize or otherwise optimize overall IOQ output and data transfer in the system while minimizing the CPU necessary to achieve the maximum IOQ output and data transfer.

With continued reference to FIG. 4, embodiments of the digestion capability and relativity engine 110 may include the IOQ assignment module 134. Embodiments of the IOQ assignment module 134 may include one or more components of hardware and/or software program code for actually changing, tuning, and/or assigning the IOQs based on the modeling and insights of the modeling and insight module 133. This may include communicating with APIs deployed in the target subsystem 112 and/or the cloud instance 114.

Referring still to FIG. 4, embodiments of the digestion capability and relativity engine 110 may further include the throttling module 135. Embodiments of the application data collection module 135 may include one or more components of hardware and/or software program code for throttling IOQ values of the computing instance(s) 114, 156 in the hybrid cloud infrastructure during the tuning for core-to-queue mapping based on endpoint resources of the target subsystem 112, 158 and/or the computing instance 114, 156.

Embodiments of the migration module 136 may include one or more components of hardware and/or software program code for determining when a cloud migration is occurring and performing recalculations for IOQ digestive capability based on the new cloud infrastructure post-migration. The migration module 136 may be configured to perform updated calculations and comparisons across multiple systems, as described hereinabove with respect to FIG. 3.

Referring still to FIG. 4, embodiments of the digestion capability and relativity engine 110 may be equipped with a memory device 142 which may store the information related to the processing performed thereby. The digestion capability and relativity engine 110 may further be equipped with a processor 141 for implementing the tasks associated with adaptive hybrid cloud resource management described herein. Moreover, the digestion capability and relativity engine 110 may include one or more data repositories for storing the collected information gathered by the modules 131, 132, as well as the models created by the modeling and insights module 133, or any other information that requires long term storage.

The digestion capability and relativity engine 110 may be connected to the target subsystem 112 and the cloud instance 114, as well as the applications 122 running in the cloud instance 114 via any type of network. The network may be any group of two or more computer systems linked together. The network may represent, for example, the internet. The network 107 may be any type of computer network known by individuals skilled in the art. Examples of computer networks which may be embodied by the network may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network may be a peer-to-peer network in some embodiments, wherein in other embodiments, the network may be organized as a client/server architecture.

Figure 5:
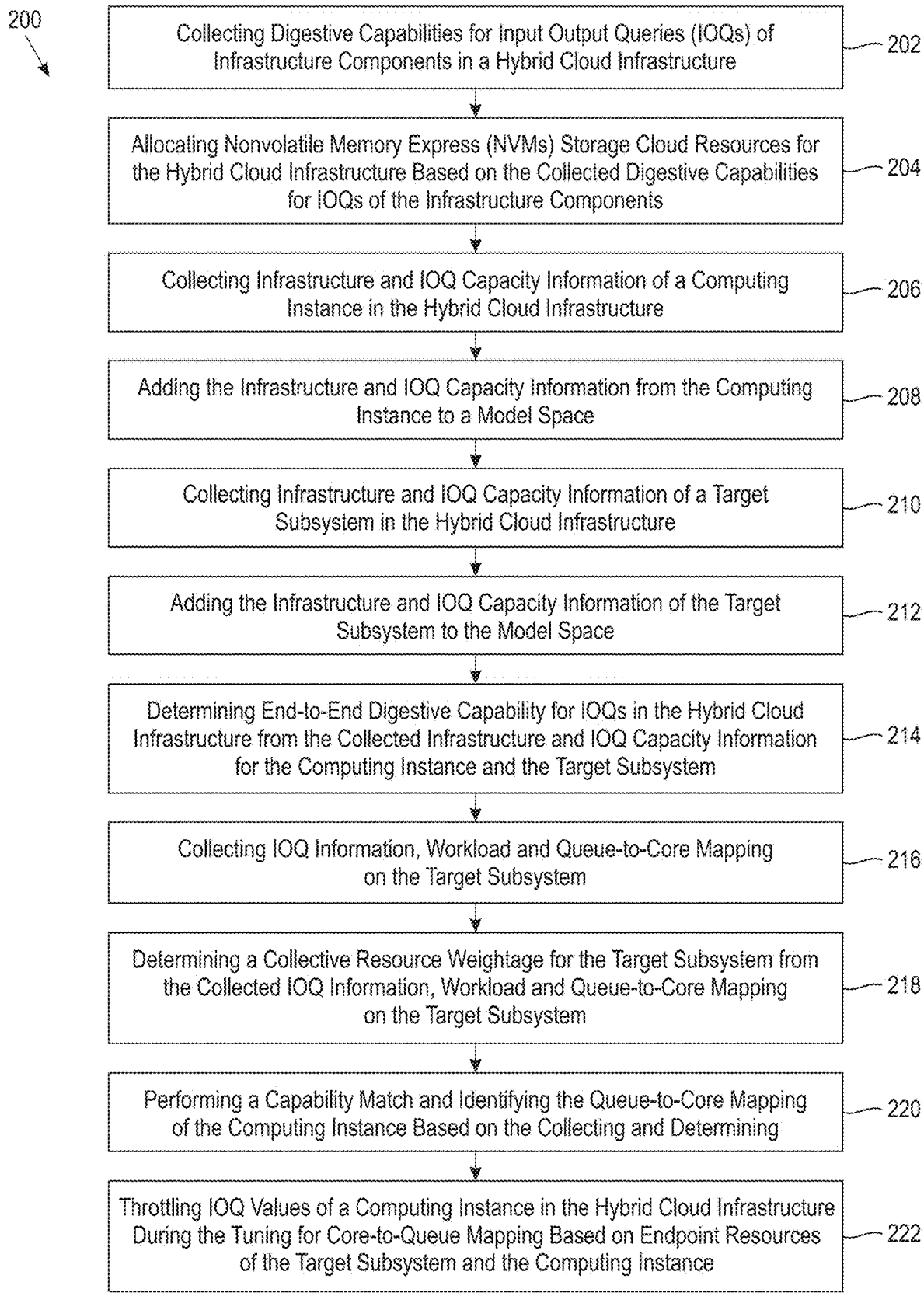
FIG. 5 depicts a flow chart of a method for adaptive hybrid cloud resource management, in accordance with embodiments of the present invention.

FIG. 5 depicts a flow chart of a method 200 for adaptive hybrid cloud resource management, in accordance with embodiments of the present invention. The method 200 includes a first step 202 of collecting digestive capabilities for Input Output Queues (IOQs) of infrastructure components in a hybrid cloud infrastructure. The method includes another step 204 of allocating nonvolatile memory express (NVMe) storage cloud resources for the hybrid cloud infrastructure based on the collected digestive capabilities for IOQs of the infrastructure components. The method 200 includes a further step 206 of collecting infrastructure and IOQ capacity information of a computing instance in the hybrid cloud infrastructure and a step 208 of adding the infrastructure and IOQ capacity information from the computing instance to a model space. The method 200 includes another step 210 of collecting infrastructure and IOQ capacity information of a target subsystem in the hybrid cloud infrastructure, and a step 212 of adding the infrastructure and IOQ capacity information of the target subsystem to the model space. The method 200 includes a step 214 of determining end-to-end digestive capability for IOQs in the hybrid cloud infrastructure from the collected infrastructure and IOQ capacity information of the computing instance and the target subsystem. The method 200 includes a step 216 of collecting IOQ information, workload and queue-to-core mapping on the target subsystem, and a step 218 of determining a collective resource weightage for the target subsystem from the collected IOQ information, workload and queue-to-core mapping on the target subsystem. The method 200 then includes a step 220 of performing a capability match and identifying the queue-to-core mapping of the computing instance based on the collecting and determining. Finally, the method 200 is shown including a step 222 of throttling IOQ values of a computing instance in the hybrid cloud infrastructure during the tuning for core-to-queue mapping based on endpoint resources of the target subsystem and the computing instance.

Figure 6:
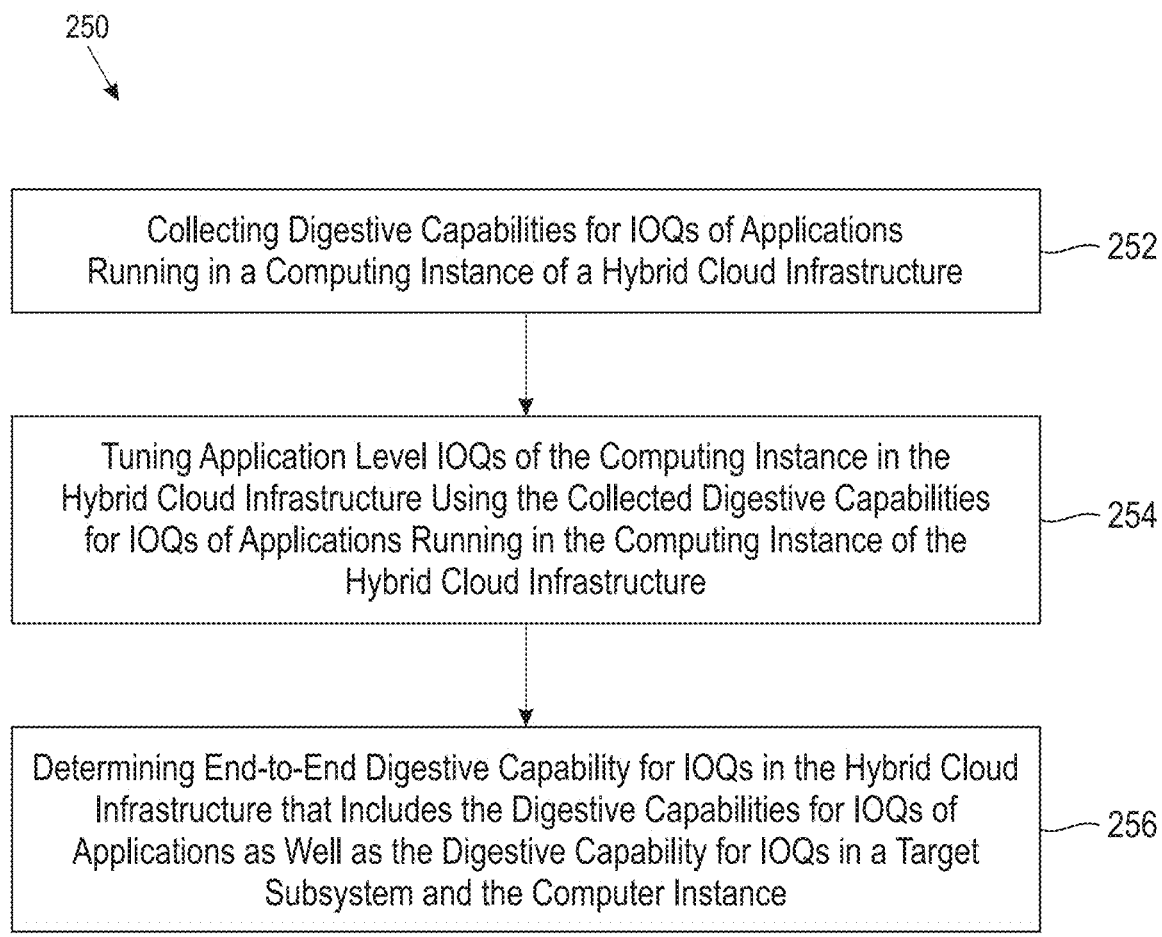
FIG. 6 depicts a flow chart of another method for adaptive hybrid cloud resource management, in accordance with embodiments of the present invention.

FIG. 6 depicts a flow chart of another method 250 for adaptive hybrid cloud resource management, in accordance with embodiments of the present invention. The method 250 includes a first step 252 of collecting digestive capabilities for IOQs of applications running in a computing instance of a hybrid cloud infrastructure. The method 250 may include a second step 252 of tuning application level IOQs of the computing instance in the hybrid cloud infrastructure using the collected digestive capabilities for IOQs of applications running in the computing instance of the hybrid cloud infrastructure. The method 250 may include a final step 254 of determining end-to-end digestive capability for IOQs in the hybrid cloud infrastructure that includes the digestive capabilities for IOQs of applications as well as the digestive capability for IOQs in a target subsystem and the computer instance. While the method 250 may be inclusive of a standalone method, it is also possible to combine the steps of the method 250 with some or all of the method 200. For example, it is possible to gather or collect the digestive capabilities for IOQs of applications running after or in addition to the digestive capabilities of the infrastructure is gathered, including the target subsystem infrastructure and the computing instance infrastructure.

Figure 7:
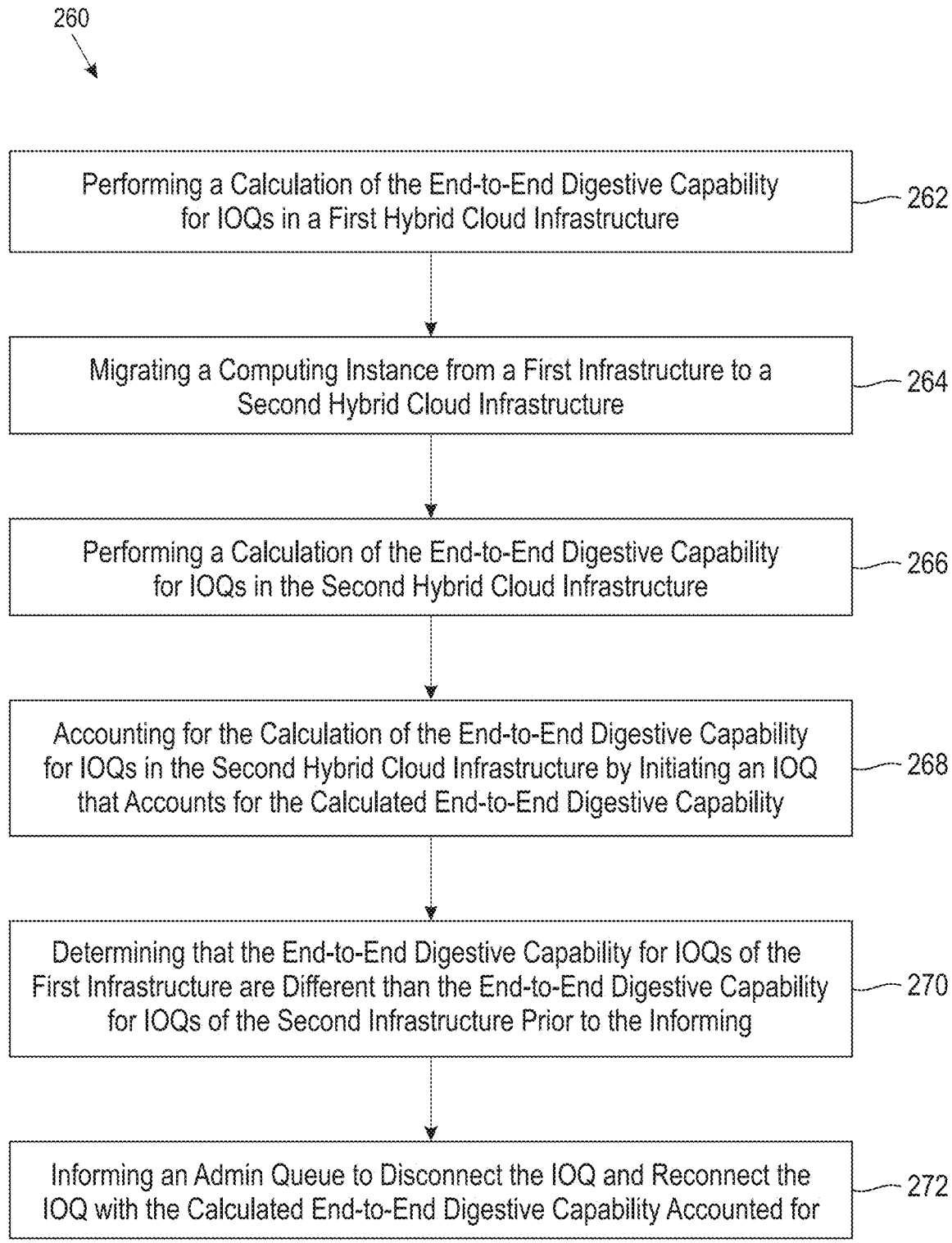
FIG. 7 depicts a flow chart of another method for adaptive hybrid cloud resource management, in accordance with embodiments of the present invention.

FIG. 7 depicts a flow chart of another method 260 for adaptive hybrid cloud resource management, in accordance with embodiments of the present invention. The method 260 includes a first step 262 of performing a calculation of the end-to-end digestive capability for IOQs in a first hybrid cloud infrastructure. The method 260 includes a next step 264 of migrating a computing instance from a first infrastructure to a second hybrid cloud infrastructure. The method 260 includes another step 266 of performing a calculation of the end-to-end digestive capability for IOQs in the second hybrid cloud infrastructure. The method 260 includes another step 268 of accounting for the calculation of the end-to-end digestive capability for IOQs in the second hybrid cloud infrastructure by initiating an IOQ that accounts for the calculated end-to-end digestive capability. The method 260 next includes a step 270 of determining that the end-to-end digestive capability for IOQs of the first infrastructure are different than the end-to-end digestive capability for IOQs of the second infrastructure prior to the informing. The method 260 finally includes a step 272 of informing an Admin Queue to disconnect the IOQ and reconnect the IOQ with the calculated end-to-end digestive capability accounted for. Like the method 250, the method 260 may be incorporated into some or all of the previous method steps described. Thus, a method that allocates IOQ resources based on the gathered information described above, may also recalculate whenever a migration occurs or a cloud instance is transferred to different infrastructure.

Figure 8:
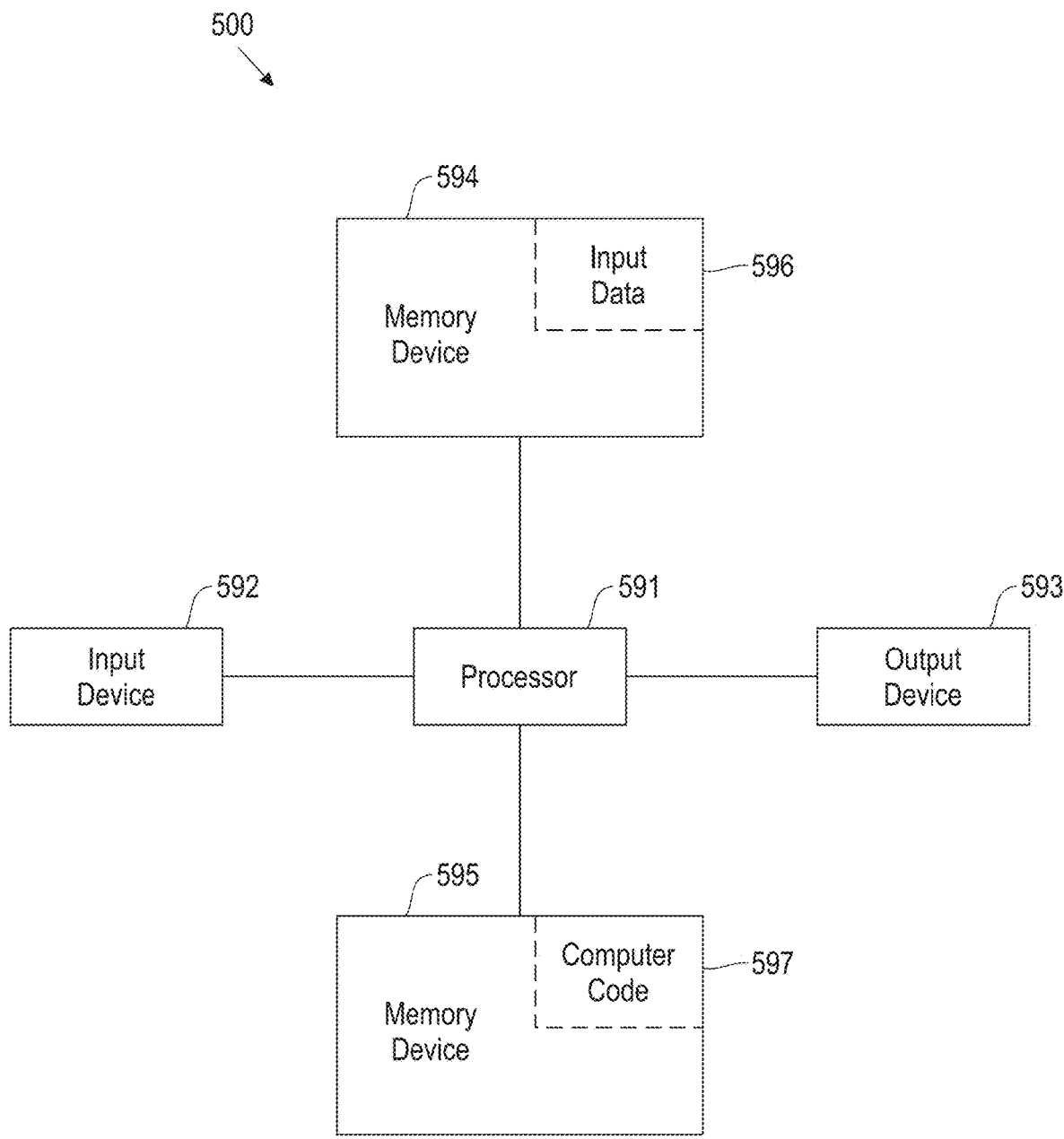
FIG. 8 depicts a block diagram of a computer system for the system and engine of FIGS. 1-4, capable of implementing methods such as those of FIGS. 5-7, in accordance with embodiments of the present invention.
Figure 9:
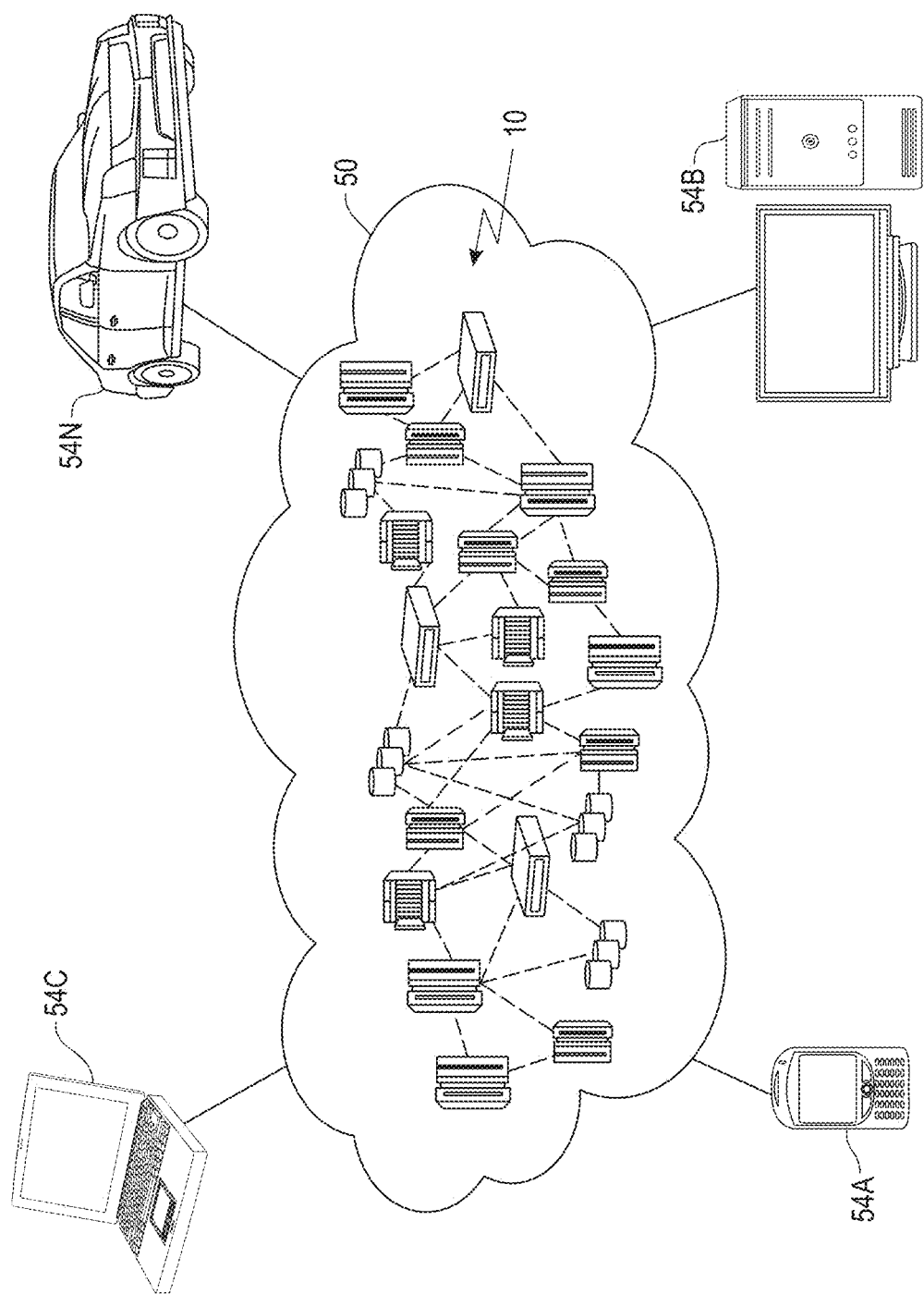
FIG. 9 depicts a cloud computing environment, in accordance with embodiments of the present invention.
Figure 10:
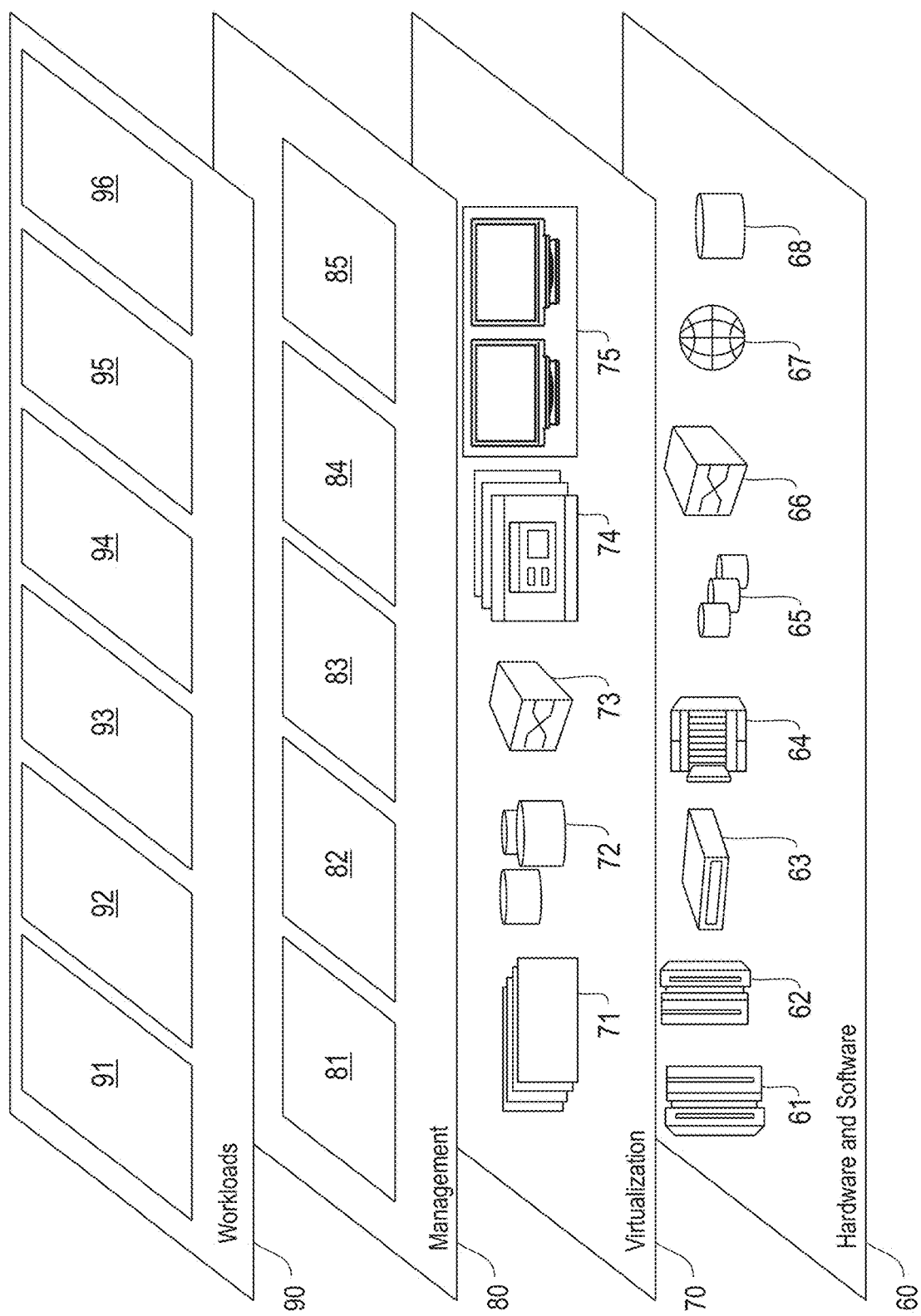
FIG. 10 depicts abstraction model layers, in accordance with embodiments of the present invention.

FIG. 8 illustrates a block diagram of a computer system that may representative of any computer or computer system within the system and engine of FIGS. 1-4, capable of implementing methods for adaptive hybrid cloud resource management of FIGS. 5-7, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for adaptive hybrid cloud resource management, in the manner prescribed by the embodiments of FIGS. 5-7 using the system and engine of FIGS. 1-4, wherein the instructions of the computer code 597 may be executed by processor 591 via memory device 595. The computer code 597 may include software or program instructions that may implement one or more algorithms for implementing the methods for adaptive hybrid cloud resource management, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for adaptive hybrid cloud resource management. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for adaptive hybrid cloud resource management. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for adaptive hybrid cloud resource management. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for adaptive hybrid cloud resource management.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: infrastructure data collection 91; application based data collection 92; modeling and insights 93; IOQ assignment 94; throttling 95; and recalculation for migration 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

collecting, by one or more processors of a computer system, digestive capabilities for Input Output Queues (IOQs) of infrastructure components in a hybrid cloud infrastructure;

allocating, by the one or more processors of the computer system, nonvolatile memory express (NVMe) storage cloud resources for the hybrid cloud infrastructure based on the collected digestive capabilities for IOQs of the infrastructure components;

collecting, by the one or more processors of the computer system, infrastructure and IOQ capacity information of a computing instance in the hybrid cloud infrastructure;

adding, by the one or more processors of the computer system, the infrastructure and IOQ capacity information from the computing instance to a model space, the model space configured to provide computational insights as to the digestive capabilities of the computing instance based on the collected information;

collecting, by the one or more processors of the computer system, infrastructure and IOQ capacity information of a target subsystem in the hybrid cloud infrastructure;

adding, by the one or more processors of the computer system, the infrastructure and IOQ capacity information of the target subsystem to the model space, the model space configured to provide computational insights as to the digestive capabilities of the target subsystem based on the collected information;

determining, by the one or more processors of the computer system, end-to-end digestive capability for IOQs in the hybrid cloud infrastructure from the collected infrastructure and IOQ capacity information of the computing instance and the target subsystem;

collecting, by the one or more processors of the computer system, digestive capabilities for IOQs of applications running in the computing instance in the hybrid cloud infrastructure; and tuning, by the one or more processors of the computer system, application level IOQs of the computing instance in the hybrid cloud infrastructure using the end-to-end digestive capability for IOQs in the hybrid cloud infrastructure and the collected digestive capabilities for IOQs of applications running in the computing instance in the hybrid cloud infrastructure.

2. The method of claim 1, further comprising:
collecting, by the one or more processors of the computer system, IOQ information, workload and queue-to-core mapping on the target subsystem;
determining, by the one or more processors of the computer system, a collective resource weightage for the target subsystem from the collected IOQ information, workload and queue-to-core mapping on the target subsystem; and
performing, by the one or more processors of the computer system, a capability match and identifying the queue-to-core mapping of the computing instance based on the collecting and determining.

3. The method of claim 1, further comprising:
throttling, by the one or more processors of the computer system, IOQ values of a computing instance in the hybrid cloud infrastructure during the tuning for core-to-queue mapping based on endpoint resources of the target subsystem and the computing instance.

4. The method of claim 1, further comprising:
migrating, by the one or more processors of the computer system, the computing instance to from the hybrid cloud infrastructure to a second hybrid cloud infrastructure;
performing, by the one or more processors of the computer system, a calculation of the end-to-end digestive capability for IOQs in the second hybrid cloud infrastructure; and
determining, by the one or more processors of the computer system, that the end-to-end digestive capability for IOQs of the hybrid cloud infrastructure are different than the end-to-end digestive capability for IOQs of the second hybrid cloud infrastructure.

5. The method of claim 4, wherein the accounting for comprises:
informing, by the one or more processors of the computer system, an Admin Queue to disconnect the IOQ and reconnect the IOQ with the calculated end-to-end digestive capability accounted for.

6. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method for adaptive hybrid cloud resource management, the method comprising:
collecting, by the one or more processors of the computer system, digestive capabilities for Input Output Queues (IOQs) of infrastructure components in a hybrid cloud infrastructure;
allocating, by the one or more processors of the computer system, nonvolatile memory express (NVMe) storage cloud resources for the hybrid cloud infrastructure based on the collected digestive capabilities for IOQs of the infrastructure components;
collecting, by the one or more processors of the computer system, infrastructure and IOQ capacity information of a computing instance in the hybrid cloud infrastructure;
adding, by the one or more processors of the computer system, the infrastructure and IOQ capacity information from the computing instance to a model space, the model space configured to provide computational insights as to the digestive capabilities of the computing instance based on the collected information;
collecting, by the one or more processors of the computer system, infrastructure and IOQ capacity information of a target subsystem in the hybrid cloud infrastructure;
adding, by the one or more processors of the computer system, the infrastructure and IOQ capacity information of the target subsystem to the model space, the model space configured to provide computational insights as to the digestive capabilities of the target subsystem based on the collected information;
determining, by the one or more processors of the computer system, end-to-end digestive capability for IOQs in the hybrid cloud infrastructure from the collected infrastructure and IOQ capacity information of the computing instance and the target subsystem;
collecting, by the one or more processors of the computer system, digestive capabilities for IOQs of applications running in the computing instance in the hybrid cloud infrastructure; and
tuning, by the one or more processors of the computer system, application level IOQs of the computing instance in the hybrid cloud infrastructure using the end-to-end digestive capability for IOQs in the hybrid cloud infrastructure and the collected digestive capabilities for IOQs of applications running in the computing instance in the hybrid cloud infrastructure.

7. The computer system of claim 6, the method further comprising:
collecting, by the one or more processors of the computer system, IOQ information, workload and queue-to-core mapping on the target subsystem;
determining, by the one or more processors of the computer system, a collective resource weightage for the target subsystem; and
performing, by the one or more processors of the computer system, a capability match and identifying the queue-to-core mapping of the computing instance based on the collecting and determining.

8. The computer system of claim 6, the method further comprising:
migrating, by the one or more processors of the computer system, the computing instance to from the hybrid cloud infrastructure to a second hybrid cloud infrastructure;
performing, by the one or more processors of the computer system, a calculation of the end-to-end digestive capability for IOQs in the second hybrid cloud infrastructure; and
determining, by the one or more processors of the computer system, that the end-to-end digestive capability for IOQs of the hybrid cloud infrastructure are different than the end-to-end digestive capability for IOQs of the second hybrid cloud infrastructure.

9. A computer program product for adaptive hybrid cloud resource management, the computer program product comprising:
one or more computer readable storage media having computer readable program code collectively stored on the one or more computer readable storage media, the computer readable program code being executed by one or more processors of a computer system to cause the computer system to perform a method comprising:

collecting, by the one or more processors of the computer system, digestive capabilities for Input Output Queues (IOQs) of infrastructure components in a hybrid cloud infrastructure;

allocating, by the one or more processors of the computer system, nonvolatile memory express (NVMe) storage cloud resources for the hybrid cloud infrastructure based on the collected digestive capabilities for IOQs of the infrastructure components;

collecting, by the one or more processors of the computer system, infrastructure and IOQ capacity information of a computing instance in the hybrid cloud infrastructure;

adding, by the one or more processors of the computer system, the infrastructure and IOQ capacity information from the computing instance to a model space, the model space configured to provide computational insights as to the digestive capabilities of the computing instance based on the collected information;

collecting, by the one or more processors of the computer system, infrastructure and IOQ capacity information of a target subsystem in the hybrid cloud infrastructure;

adding, by the one or more processors of the computer system, the infrastructure and IOQ capacity information of the target subsystem to the model space, the model space configured to provide computational insights as to the digestive capabilities of the target subsystem based on the collected information;

determining, by the one or more processors of the computer system, end-to-end digestive capability for IOQs in the hybrid cloud infrastructure from the collected infrastructure and IOQ capacity information of the computing instance and the target subsystem;

collecting, by the one or more processors of the computer system, digestive capabilities for IOQs of applications running in the computing instance in the hybrid cloud infrastructure; and tuning, by the one or more processors of the computer system, application level IOQs of the computing instance in the hybrid cloud infrastructure using the end-to-end digestive capability for IOQs in the hybrid cloud infrastructure and the collected digestive capabilities for IOQs of applications running in the computing instance in the hybrid cloud infrastructure.

10. The computer program product of claim 9, the method further comprising:

collecting, by the one or more processors of the computer system, IOQ information, workload and queue-to-core mapping on the target subsystem; determining, by the one or more processors of the computer system, a collective resource weightage for the target subsystem; and performing, by the one or more processors of the computer system, a capability match and identifying the queue-to-core mapping of the computing instance based on the collecting and determining.

11. The computer system of claim 9, the method further comprising:

migrating, by the one or more processors of the computer system, the computing instance to from the hybrid cloud infrastructure to a second hybrid cloud infrastructure; performing, by the one or more processors of the computer system, a calculation of the end-to-end digestive capability for IOQs in the second hybrid cloud infrastructure; and determining, by the one or more processors of the computer system, that the end-to-end digestive capability for IOQs of the hybrid cloud infrastructure are different than the end-to-end digestive capability for IOQs of the second hybrid cloud infrastructure.

12. A method comprising:

collecting, by one or more processors of a computer system, digestive capabilities for Input Output Queues (IOQs) of infrastructure components in a hybrid cloud infrastructure;

allocating, by the one or more processors of the computer system, nonvolatile memory express (NVMe) storage cloud resources for the hybrid cloud infrastructure based on the collected digestive capabilities for IOQs of the infrastructure components;

collecting, by the one or more processors of the computer system, infrastructure and IOQ capacity information of a computing instance in the hybrid cloud infrastructure;

adding, by the one or more processors of the computer system, the infrastructure and IOQ capacity information from the computing instance to a model space, the model space configured to provide computational insights as to the digestive capabilities of the computing instance based on the collected information;

collecting, by the one or more processors of the computer system, infrastructure and IOQ capacity information of a target subsystem in the hybrid cloud infrastructure;

adding, by the one or more processors of the computer system, the infrastructure and IOQ capacity information of the target subsystem to the model space, the model space configured to provide computational insights as to the digestive capabilities of the target subsystem based on the collected information;

determining, by the one or more processors of the computer system, end-to-end digestive capability for IOQs in the hybrid cloud infrastructure from the collected infrastructure and IOQ capacity information of the computing instance and the target subsystem;

collecting, by the one or more processors of the computer system, IOQ information, workload and queue-to-core mapping on the target subsystem;

determining, by the one or more processors of the computer system, a collective resource weightage for the target subsystem from the collected IOQ information, workload and queue-to-core mapping on the target subsystem;

performing, by the one or more processors of the computer system, a capability match and identifying the queue-to-core mapping of the computing instance based on the collecting the IOQ information and queue-to-core mapping on the target subsystem and the determining the collective resource weightage for the target subsystem from the collected IOC information, workload and queue-to-core mapping on the target subsystem; and throttling, by the one or more processors of the computer system, IOQ values of the computing instance in the hybrid cloud infrastructure based on the capability match.

13. The method of claim 12, further comprising:

collecting, by the one or more processors of the computer system, digestive capabilities for IOQs of applications running in the computing instance in the hybrid cloud infrastructure; and tuning, by the one or more processors of the computer system, application level IOQs of the computing instance in the hybrid cloud infrastructure using the end-to-end digestive capability for IOQs in the hybrid cloud infrastructure and the collected digestive capabilities for IOQs of applications running in the computing instance in the hybrid cloud infrastructure.

14. The method of claim 13, further comprising:
throttling, by the one or more processors of the computer system, the IOQ values of a computing instance in the hybrid cloud infrastructure during the tuning for core-to-queue mapping based on endpoint resources of the target subsystem and the computing instance.

15. The method of claim 12, further comprising:
migrating, by the one or more processors of the computer system, the computing instance to from the hybrid cloud infrastructure to a second hybrid cloud infrastructure;
performing, by the one or more processors of the computer system, a calculation of the end-to-end digestive capability for IOQs in the second hybrid cloud infrastructure; and
determining, by the one or more processors of the computer system, that the end-to-end digestive capability for IOQs of the hybrid cloud infrastructure are different than the end-to-end digestive capability for IOQs of the second hybrid cloud infrastructure.

16. The method of claim 15, wherein the accounting for comprises:
informing, by the one or more processors of the computer system, an Admin Queue to disconnect the IOQ and reconnect the IOQ with the calculated end-to-end digestive capability accounted for.

17. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method for adaptive hybrid cloud resource management, the method comprising:
collecting, by the one or more processors of the computer system, digestive capabilities for Input Output Queues (IOQs) of infrastructure components in a hybrid cloud infrastructure;
allocating, by the one or more processors of the computer system, nonvolatile memory express (NVMe) storage cloud resources for the hybrid cloud infrastructure based on the collected digestive capabilities for IOQs of the infrastructure components;
collecting, by the one or more processors of the computer system, infrastructure and IOQ capacity information of a computing instance in the hybrid cloud infrastructure;
adding, by the one or more processors of the computer system, the infrastructure and IOQ capacity information from the computing instance to a model space, the model space configured to provide computational insights as to the digestive capabilities of the computing instance based on the collected information;
collecting, by the one or more processors of the computer system, infrastructure and IOQ capacity information of a target subsystem in the hybrid cloud infrastructure;
adding, by the one or more processors of the computer system, the infrastructure and IOQ capacity information of the target subsystem to the model space, the model space configured to provide computational insights as to the digestive capabilities of the target subsystem based on the collected information;
determining, by the one or more processors of the computer system, end-to-end digestive capability for IOQs in the hybrid cloud infrastructure from the collected infrastructure and IOQ capacity information of the computing instance and the target subsystem;
collecting, by the one or more processors of the computer system, IOQ information, workload and queue-to-core mapping on the target subsystem;
determining, by the one or more processors of the computer system, a collective resource weightage for the target subsystem from the collected IOQ information, workload and queue-to-core mapping on the target subsystem;
performing, by the one or more processors of the computer system, a capability match and identifying the queue-to-core mapping of the computing instance based on the collecting the IOQ information and queue-to-core mapping on the target subsystem and the determining the collective resource weightage for the target subsystem from the collected IOC information, workload and queue-to-core mapping on the target subsystem; and
throttling, by the one or more processors of the computer system, IOQ values of a computing instance in the hybrid cloud infrastructure based on the capability match.

18. The computer system of claim 17, the method further comprising:
collecting, by the one or more processors of the computer system, digestive capabilities for IOQs of applications running in the computing instance in the hybrid cloud infrastructure; and
tuning, by the one or more processors of the computer system, application level IOQs of the computing instance in the hybrid cloud infrastructure using the end-to-end digestive capability for IOQs in the hybrid cloud infrastructure and the collected digestive capabilities for IOQs of applications running in the computing instance in the hybrid cloud infrastructure.

19. The computer system of claim 18, the method further comprising:
throttling, by the one or more processors of the computer system, the IOQ values of a computing instance in the hybrid cloud infrastructure during the tuning for core-to-queue mapping based on endpoint resources of the target subsystem and the computing instance.

20. The computer system of claim 17, the method further comprising:
migrating, by the one or more processors of the computer system, the computing instance to from the hybrid cloud infrastructure to a second hybrid cloud infrastructure;
performing, by the one or more processors of the computer system, a calculation of the end-to-end digestive capability for IOQs in the second hybrid cloud infrastructure; and
determining, by the one or more processors of the computer system, that the end-to-end digestive capability for IOQs of the hybrid cloud infrastructure are different than the end-to-end digestive capability for IOQs of the second hybrid cloud infrastructure.

21. The computer system of claim 20, wherein the accounting for comprises:
informing, by the one or more processors of the computer system, an Admin Queue to disconnect the IOQ and reconnect the IOQ with the calculated end-to-end digestive capability accounted for.

* * * * *